United States Patent

[11] 3,617,837

| | | |
|---|---|---|
| [72] | Inventor | Francis J. Beck<br>Churchville, Pa. |
| [21] | Appl. No. | 78,499 |
| [22] | Filed | Oct. 6, 1970 |
| [45] | Patented | Nov. 2, 1971 |
| [73] | Assignee | Honeywell Inc.<br>Minneapolis, Minn. |

[54] PULSE ACTUATED MOTOR CONTROL CIRCUIT
5 Claims, 1 Drawing Fig.

[52] U.S. Cl. .................................................. 318/212,
318/266, 318/466, 318/470
[51] Int. Cl. ...................................................... H02p 3/24
[50] Field of Search ............................................ 318/211,
212, 466, 470, 266

[56] References Cited
UNITED STATES PATENTS

| 3,305,714 | 2/1967 | Plumpe, Jr. .................... | 318/212 |
|---|---|---|---|
| 3,341,758 | 9/1967 | Plumpe, Jr. .................... | 318/212 |

*Primary Examiner*—Gene Z. Rubinson
*Attorneys*—Arthur H. Swanson and Lockwood D. Burton ABSTRACT: A motor control circuit includes a momentary contact closure which actuates a switching means to apply an AC signal to the motor field windings causing rotation of the motor armature. Means are also provided to detect a predetermined rotational movement of the armature and, upon attainment thereof, to apply a DC signal to the field windings and thereby arrest the armature rotation.

PATENTED NOV 2 1971 3,617,837
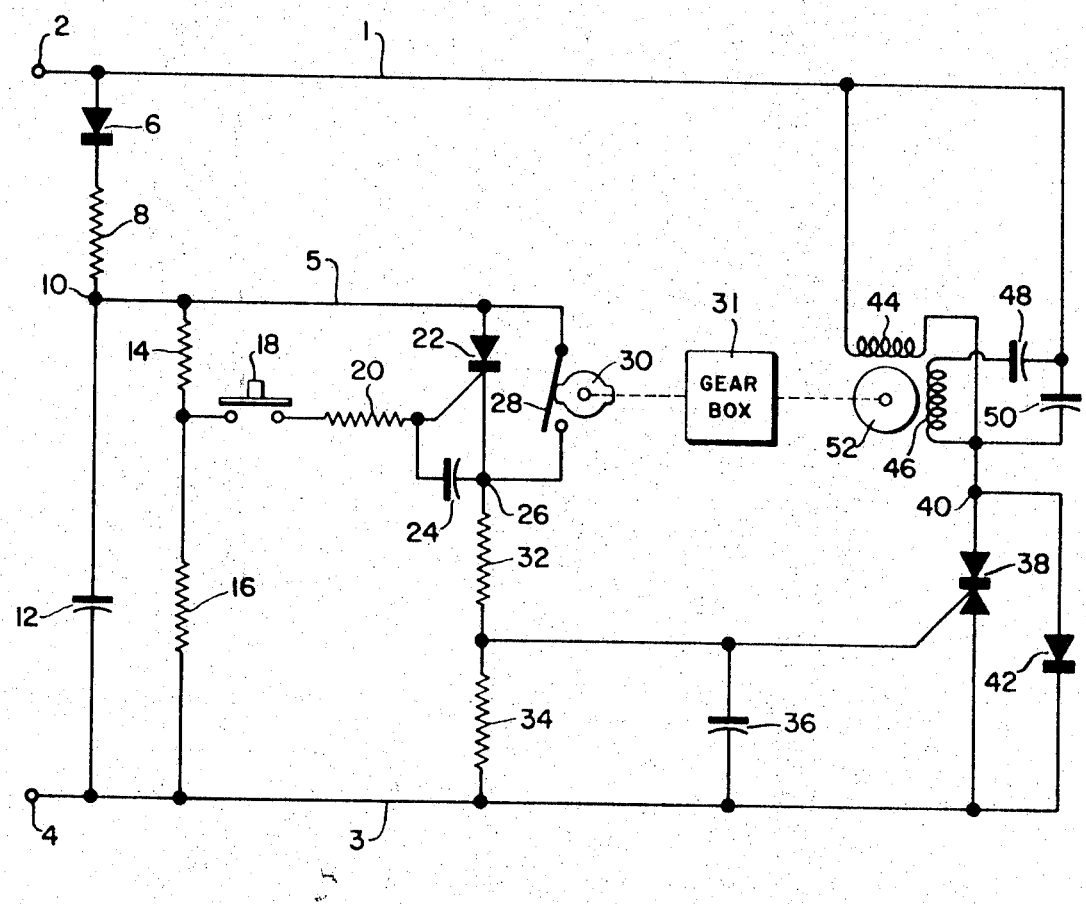
INVENTOR.
FRANCIS J. BECK
BY Lockwood D Burton
ATTORNEY.

PULSE ACTUATED MOTOR CONTROL CIRCUIT

The present invention relates to motor control circuits and more particularly to a circuit for initiating a preselected rotational movement of an armature of a motor by a momentary signal and automatically stopping and holding the armature in situ following a predetermined armature rotation.

In the past, motor control circuits have been provided to effect rotation of an armature only during the presence of a continuing actuating signal. When the actuating signal is removed the armature ceases to rotate. Thus in the case of a push-button actuation device, the motor armature would rotate only when the pushbutton is engaged. This awkward control problem was partially alleviated through the use of a timing circuit. A momentary signal would actuate the timing circuit which would effectuate rotation of an armature for a predetermined amount of time. The timing circuit however, introduced several disadvantages. For example the age of the components comprising the timing circuit as well as the ambient temperature of the environment surrounding the timing circuit eventually cause circuit element characteristic changes. Those changes, in turn, distort the essential time characteristic of the circuit. Another disadvantage is that the armature position errors caused by the changes in the time delay circuit, are cumulative in nature. For example when a time delay circuit provides a time delay which is one-tenth of a second longer than the rated time delay, an armature may travel one-tenth of a revolution beyond its commanded position. After a second change position command, another one-tenth of a revolution error is added to the first position error so that the armature will come to rest at a position which is two-tenths of a revolution past its intended position, and so on.

Another source of error is the application of a braking force after the completion of a commanded movement of a motor armature. If the braking force is not applied at the proper time or with a sufficient magnitude, the inertia of a motor armature will cause the armature to either stop before reaching a desired position, or to rotate beyond the correct position. The position errors caused by the inertia of a motor armature present a major control problem.

A prior art motor control circuit includes the automatic application of a DC signal on the field windings of a motor, thereby braking the motor upon the removal of a rotation-inducing AC signal. That DC signal however, decays in time and therefore the circuit is helpful only in situations where a temporary braking and holding of a motor armature is required. After a period of time, the DC signal disappears and the armature is again subject to external forces which may move the armature out of its correct position. Also, if the motor is not "on" for a minimum amount of time, the DC source may not receive sufficient charge to effectively brake the armature when called upon to do so. The need for a controlled rotation of a motor armature from a momentary signal becomes increasingly greater in the light of expanding computer control systems. The increased complexity and cost of stepping motors has been tolerated heretofore in order to obtain some measure of satisfaction for this need while the search for a less expensive and less troublesome system continued.

It is accordingly an object of the present invention to provide an improved motor control circuit which obviates the disadvantages of prior art apparatus.

It is a further object of the present invention to provide an improved motor control circuit which is pulse actuable and employs a standard single/split phase induction motor to provide a motor control circuit which is inherently substantially free from cumulative armature position errors.

It is another object of the present invention to provide a motor control circuit which automatically applies a constant braking force to the motor armature upon completion of a desired rotational movement.

In accomplishing these and other objects there has been provided, in accordance with the present invention, a motor control system which includes a switching means that is responsive to a momentary signal to apply an AC signal to the field windings of an induction motor thereby inducing rotation of the motor armature. After a predetermined rotational movement, an actutating means coupled to the motor armature causes the switching means to discontinue the application of the AC signal to the motor field windings and, instead, to apply a substantially constant DC signal to the windings, thereby effectively stopping the rotation of the armature and holding the armature in place until the next rotation-commanding signal is received.

A better understanding of the invention may be had from the following detailed description when read in connection with the single accompanying drawing which is a circuit diagram of an exemplary embodiment of the present invention.

Referring to the drawing in more detail, there is shown a first input terminal 2 connected to a first common bus 1. A second input terminal 4 is connected to a second common bus 3. A first motor field winding 44 is connected between a first common bus 1 and a first common junction 40. The first common bus 1 is also connected to one terminal of a capacitor 48 and one terminal of a capacitor 50. The other terminal of capacitor 48 is connected through a second motor field winding 46 to the first common junction 40 to which the second terminal of capacitor 50 is also connected. The first common junction 40 is connected to one terminal of a Triac 38 and also to the anode terminal of a diode 42. For the purposes of the present invention, a Triac is defined as a solid state, voltage controlled three terminal symmetrical switch. The cathode terminal of the diode 42 is connected to the second common bus 3 as is the second terminal of the Triac 38. The control terminal of the Triac 38 is connected to a common point connecting a capacitor 36, a resistor 34, and a resistor 32. The other terminals of the capacitor 36 and the resistor 34 are connected to the second bus 3. The other terminal of the resistor 32 is connected to a second common junction 26. A first switching device in the example, comprises an SCR 22 with its anode terminal connected to a third common bus 5 which supplies a DC signal thereto. Its cathode terminal is connected to the second common junction 26. A second switching device 28 is connected between the third common bus 5 and the second common junction 26. The second switching device 28 is opened when the bosses of an actuating means 30 come in contact therewith. Otherwise, the second switching device 28 is closed. The actuating means 30 is coupled to the motor armature 52 through a gear box 31. The coupling ratio provided by the gear box 31 may be established at any value to suit any particular application; it may even be eliminated altogether, if conditions warrant, with the armature 52 directly connected to the actuator 30. A capacitor 24 has one terminal connected to the second common junction 26 and its other terminal connected to a common point connecting a resistor 20 and the control electrode of the SCR 22. The other terminal of the resistor 20 is connected to one terminal of a momentary contact closure device 18 which is shown as a pushbutton in the illustrated example. The other terminal of the momentary contact closure device 18 is connected to a common point connecting a resistor 14 and a resistor 16. The second terminal of the resistor 16 is connected to the second common bus 3 while the second terminal of the resistor 14 is connected to a third common junction 10. The anode of a diode 6 is connected to the first common bus 1 and its cathode is connected one terminal of a resistor 8. The other terminal of the resistor 8 is connected to the third common junction 10. A capacitor 12 has one terminal connected to the third common junction 10 and its other terminal connected to the second common bus 3.

In operation, an AC signal is applied to the input terminals 2 and 4. The first motor field winding 44 together with the second motor field winding 46 and the capacitor 48 comprise a field winding means which upon being energized with an AC signal causes the motor armature to rotate since a rotating magnetic field is produced. When the field winding means is energized with the DC signal a braking force is applied to the motor armature since a stationary field is produced which interacts with the rotating armature to produce a flux field in the armature opposing further rotation. The SCR 22, together with the actuating means 30, the second switching device 28, the resistors 32 and 34, and the third switching device or Triac 38, substantially comprise a first switching means. The diode 6, the capacitor 12, the resistors 14 and 16, momentary contact closure 18, substantially make up a first control signal means. Generally, the first switching means is responsive to a momentary closure of the push-button switch 18 to provide a completed circuit for the AC input signal to pass through the field winding means. The first switching means also responds to the actuating means 30 to open-circuit the established AC path and simultaneously introduce a rectifying means 42 into the AC path. The rectifier means 42 allows only a half-wave rectified signal to pass through the field winding means, and a smoothing capacitor 50 cooperates with the rectifier means 42 to provide a relatively stable DC signal.

The first switching means includes a diode 6 which allows only the positive half-waves of the AC input signal, applied at the input terminals 2 and 4, to pass and the capacitor 12 stores the accumulated charge which is substantially equal to the potential of the half-wave peaks of the input signal. The resistors 14 and 16 act as a voltage divider to obtain the proper signal level to selectively turn on the SCR 22. When the push button switch 18 is momentarily closed, the SCR 22 is rendered conductive and remains conductive even after the subsequent removal of the first control signal by the release of the pushbutton 18. A current signal is thus allowed to flow through the SCR 22. At that instant, the second switching device 28 is in its open position since it is in contact with one of the bosses on the actuating means 30 which is the normal static condition of the system. The current passing through the SCR 22 also flows through the resistors 32 and 34. These act as a voltage divider for the purpose of obtaining a proper trigger potential required to actuate the third switching device or Triac 38. The capacitor 36 will short out any spurious signals. Whenever the SCR 22 is conductive, the proper triggering potential appears at the common point connecting resistor 32 and resistor 34 thereby rendering the third switching device 38 conductive. The conductive path established by the third switching device 38 between the first common junction 40 and the second common bus 3, short circuits the diode 42 and allows the AC input signal to pass through the field winding means, thereby inducing the rotation of the motor armature 42. After a predetermined rotational movement of the armature 52, a boss on the actuating means 30 disengages the switching device 28 thereby allowing the second switching device 28 to close and short circuit the SCR 22. Because of the nature of the SCR, when the voltage signal applied across its terminal drops below a threshold level, the device is rendered nonconductive. Therefore, when the second switching device 28 closes, the SCR 22 is rendered nonconductive but the second switching device 28 maintains the current signal through the resistors 32 and 34 thereby assuring proper control potential for the third switching device 38 at the common junction of resistors 32 and 34. A short time later, after a predetermined further rotational movement of the motor armature 52, one of the bosses on the actuating means 30 reengages with and thereby opens the second switching device 28. Since the SCR 22 is already cutoff, no current signals flow through resistors 32 and 34 and therefore the proper control potential is not present at the common junction of resistors 32 and 34. The third switching device or triac 38 is therefore rendered nonconductive With the triac 38 cut off, the diode 42 allows only the positive half cycles of the AC input signal to pass through the field winding means of the motor. Such positive half-cycles effectively provide a DC signal passing through the field winding means. The capacitor 50 acts as a smoothing capacitor to minimize the ripple of the signal passed by the diode 42. The resulting braking force produced by the DC signal passing through the field winding means will cause a braking force to be applied to the motor armature 52 which will remain constant until the next control signal is initiated by the momentary pushbutton 18. It can be seen that the armature position error of the present system is not cumulative since the rotational movement of the armature is arrested through a mechanical feedback means coupled to the armature position, itself, and not to an independent timing system.

Thus, there has been provided a motor control circuit which is actuated by a momentary signal thereby causing the motor motor armature to rotate a predetermined amount, and, upon attainment thereof, to automatically apply a braking force upon the motor armature which will remain constant until the next control signal is received, whereupon the cycle is repeated without accumulating armature position error.

The embodiments of the invention in which an exclusive property or privilege is claimed are defined as follows:

1. A system for controlling the operation of an AC motor, said motor including a field winding means and an armature, said system comprising:
   means for providing an AC signal for said field winding means to impart rotary motion to said armature in response thereto;
   means for providing a DC signal;
   first switching means for selectively and alternatively applying said AC signal and said DC signal to said field winding means;
   first control signal means for generating a first control signal;
   said first switching means being responsive to said first control signal to be conditioned thereby to apply said AC signal to said field winding means whereby to initiate said rotary motion of said armature; and
   actuating means coupled to said armature and responsive to a predetermined rotational movement of said armature for further conditioning said first switching means to apply said DC signal to said armature to arrest the rotary motion of said armature whereby said armature is rotated a predetermined amount for each of said first control signals.

2. The invention as set forth in claim 1, wherein said means for providing an AC signal includes first and second input terminals, said field winding means being connected between said first input terminal and a first common junction,
   and wherein said first switching means includes:
   a first switching device responsive to said first control signal to pass a first current signal therethrough;
   a second switching device connected across said first switching device and responsive to said actuation means to pass a second current signal therethrough whereby to open-circuit said first switching device;
   a second control signal means connecting said first switching device and said second switching device to said second input terminal and responsive to said first and second current signals to provide a second control signal;
   a third switching device connected between said first common junction and said second input terminal, and across said means for providing a DC signal, said third switching device responsive to said second control signal for selectively applying said AC signal and said DC signal to said field winding means.

3. The invention as set forth in claim 2 wherein said second control signal means comprises a voltage divider.

4. The invention as set forth in claim 2 wherein said means for providing a DC signal includes rectifier means operative upon the opening of said third switching device to rectify said AC signal whereby effectively to provide said DC signal.

5. The invention as set forth in claim 2 wherein said first control signal means includes:
   a rectifier means connected to said first input terminal for providing a rectified AC signal; an electrical storage means connected between said rectifier means and said second input terminal for storing substantially the peak value of said rectified AC signal;

a voltage divider means connecting the common point between said rectifier means and said electrical storage means to said second input terminal for providing a first control signal; and a momentary contact means connected between said voltage divider means and said first switching device and selectively operative to apply said first control signal to said first switching device.

* * * * *